United States Patent
Von Novak, III et al.

(10) Patent No.: US 9,793,748 B2
(45) Date of Patent: Oct. 17, 2017

(54) METHODS AND APPARATUS FOR CONTROLLING TOUCHSCREEN INTERFERENCE

(71) Applicant: QUALCOMM Incorporated, San Diego, CA (US)

(72) Inventors: William Henry Von Novak, III, San Diego, CA (US); Cody Burton Wheeland, San Diego, CA (US); Michael Antar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 14/841,457

(22) Filed: Aug. 31, 2015

(65) Prior Publication Data

US 2017/0063145 A1 Mar. 2, 2017

(51) Int. Cl.
*H02J 7/04* (2006.01)
*H02J 7/02* (2016.01)
*G06F 3/041* (2006.01)
*G06F 3/044* (2006.01)

(52) U.S. Cl.
CPC ............ *H02J 7/042* (2013.01); *G06F 3/0418* (2013.01); *H02J 7/025* (2013.01); *G06F 3/044* (2013.01)

(58) Field of Classification Search
CPC .......... G06F 2203/04104; G06F 3/0414; H02J 7/025; H02J 7/042
USPC ........................................................ 320/108
See application file for complete search history.

(56) References Cited

U.S. PATENT DOCUMENTS

| | | | | |
|---|---|---|---|---|
| 8,577,644 B1 * | 11/2013 | Ksondzyk et al. | ... | G06F 3/0414 345/173 |
| 8,766,940 B1 * | 7/2014 | Starner et al. | .......... | G06F 3/041 345/173 |
| 9,041,671 B2 * | 5/2015 | Deokar et al. | ........ | G06F 3/0416 345/173 |
| 2010/0079401 A1 | 4/2010 | Staton | | |

(Continued)

FOREIGN PATENT DOCUMENTS

CN 103389847 A 11/2013

OTHER PUBLICATIONS

International Search Report and Written Opinion—PCT/US2016/047189—ISA/EPO—dated Oct. 20, 2016.

*Primary Examiner* — Sun Lin
(74) *Attorney, Agent, or Firm* — Knobbe, Martes, Olson & Bear, LLP

(57) ABSTRACT

This application describes methods and apparatus for controlling touchscreen interferences. In one aspect, a wireless power device for receiving charging power via a wireless charging field of a wireless charging device is provided. The wireless power device comprises a sensor circuit configured to detect at least one signal from a touchscreen, the detected at least one signal indicating an interaction with the touchscreen. The wireless power device further comprises a processor circuit configured to determine whether the detected at least one signal is a result of a false contact with the touchscreen resulting from the wireless charging field. The wireless power device further comprises a transmitter circuit configured to transmit, based on determining that the detected at least one signal is a result of the false contact with the touchscreen, a first message to the wireless charging device to lower a strength of the wireless charging field.

30 Claims, 7 Drawing Sheets

(56) References Cited

U.S. PATENT DOCUMENTS

| | | |
|---|---|---|
| 2012/0249449 A1 | 10/2012 | Tseng et al. |
| 2014/0035378 A1 | 2/2014 | Kesler et al. |
| 2014/0267059 A1 | 9/2014 | Deokar et al. |
| 2014/0267132 A1 | 9/2014 | Rabii et al. |

* cited by examiner

METHODS AND APPARATUS FOR CONTROLLING TOUCHSCREEN INTERFERENCE

TECHNICAL FIELD

The described technology generally relates to wireless power. More specifically, the disclosure is directed to devices, systems, and methods related to wireless power transfer comprising controlling touchscreen interference.

BACKGROUND

An increasing number and variety of electronic devices are powered via rechargeable batteries. Such devices include mobile phones, electric vehicles, portable music players, laptop computers, tablet computers, computer peripheral devices, communication devices (e.g., Bluetooth devices), digital cameras, hearing aids, and the like. While battery technology has improved, battery-powered electronic devices increasingly require and consume larger amounts of power, thereby often requiring recharging. Rechargeable devices are often charged via wired connections that require cables or other similar connectors that are physically connected to a power supply. Cables and similar connectors may sometimes be inconvenient or cumbersome and have other drawbacks. Wireless charging systems that are capable of transferring power in free space to charge rechargeable electronic devices may overcome some of the deficiencies of wired charging solutions. However, wireless charging systems may cause interference with other electronic components, such as a touchscreen of the rechargeable electronic devices. As such, wireless charging systems and methods for controlling touchscreen interference are desirable.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of the various embodiments of this invention provide advantages that include improved controlling of touchscreen interferences in wireless power systems.

One aspect of this invention includes wireless power device for receiving charging power via a wireless charging field of a wireless charging device. The wireless device comprises a sensor circuit configured to detect at least one signal from a touchscreen, the detected at least one signal indicating an interaction with the touchscreen. The wireless device further comprises a processor circuit configured to determine whether the detected at least one signal is a result of a false contact with the touchscreen resulting from the wireless charging field. The wireless device further comprises a transmitter circuit configured to transmit, based on determining that the detected at least one signal is a result of the false contact with the touchscreen, a first message to the wireless charging device to lower a strength of the wireless charging field.

Another aspect disclosed is a method for receiving charging power via a wireless charging field of a wireless charging device. The method comprises detecting at least one signal from a touchscreen, the detected at least one signal indicating an interaction with the touchscreen. The method further comprises determining whether the detected at least one signal is a result of a false contact with the touchscreen resulting from the wireless charging field. The method further comprises transmitting, based on determining that the detected at least one signal is a result of the false contact with the touchscreen, a first message to the wireless charging device to lower a strength of the wireless charging field.

Another aspect disclosed is a wireless power device for receiving charging power via a wireless charging field of a wireless charging device. The wireless device comprises means for detecting at least one signal from a touchscreen, the detected at least one signal indicating an interaction with the touchscreen. The wireless device further comprises means for determining whether the detected at least one signal is a result of a false contact with the touchscreen resulting from the wireless charging field. The wireless device further comprises means for transmitting, based on determining that the detected at least one signal is a result of the false contact with the touchscreen, a first message to the wireless charging device to lower a strength of the wireless charging field.

Yet another aspect disclosed includes non-transitory computer-readable medium comprising code that, when executed, performs a method for receiving charging power via a wireless charging field of a wireless charging device. The method comprises detecting at least one signal from a touchscreen, the detected at least one signal indicating an interaction with the touchscreen. The method further comprises determining whether the detected at least one signal is a result of a false contact with the touchscreen resulting from the wireless charging field. The method further comprises transmitting, based on determining that the detected at least one signal is a result of the false contact with the touchscreen, a first message to the wireless charging device to lower a strength of the wireless charging field.

Details of one or more embodiments of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

The terminology used herein is for the purpose of describing particular implementations only and is not intended to be limiting of the disclosure. If a specific number of a claim element is intended, such intent will be explicitly recited in the claim, and in the absence of such recitation, no such intent is present. For example, as used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
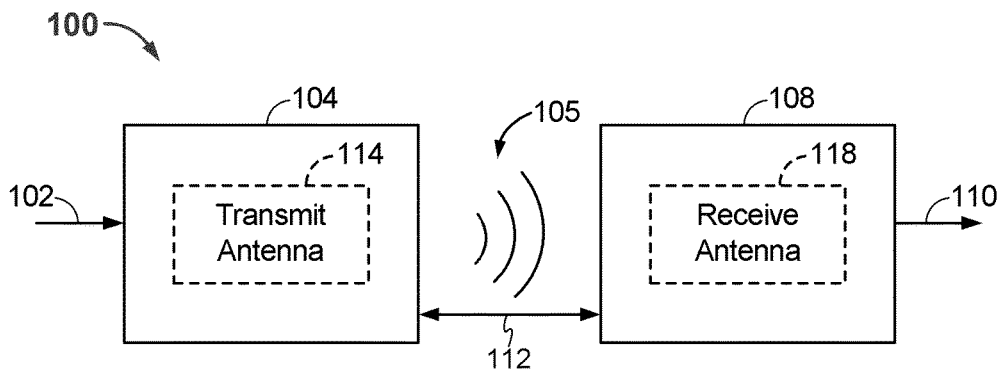
FIG. 1 is a functional block diagram of a wireless power transfer system, in accordance with an exemplary embodiment.

FIG. 1 is a functional block diagram of a wireless power transfer system 100, in accordance with one exemplary implementation. Input power 102 is provided to a transmitter 104 from a power source (not shown in this figure) to generate a wireless (e.g., magnetic or electromagnetic) field 105 for performing energy transfer. A receiver 108 couples to the wireless field 105 and generates output power 110 for storing or consumption by a device (not shown in this figure) coupled to the output power 110. Both the transmitter 104 and the receiver 108 are separated by a distance 112.

The receiver 108 may wirelessly receive power when the receiver 108 is located in the wireless field 105 generated by the transmitter 104. The transmitter 104 includes a transmit coil or transmit antenna 114 for transmitting energy to the receiver 108 via the wireless field 105. The receiver 108 includes a receive coil or receive antenna 118 for receiving or capturing energy transmitted from the transmitter 104 via the wireless field 105. The wireless field 105 corresponds to a region where energy output by the transmitter 104 may be captured by the receiver 108. In some implementations, the wireless field 105 may correspond to the "near-field" of the transmitter 104. The near-field may correspond to a region in which there are strong reactive fields resulting from the currents and charges in the transmit antenna 114 that minimally radiate power away from the transmit antenna 114. The near-field may correspond to a region that is within about one wavelength (or a fraction thereof) of the transmit antenna 114.

In one exemplary implementation, the wireless field 105 may be a magnetic field and the transmitter 104 and the receiver 108 are configured to inductively transfer power. The transmitter 104 and the receiver 108 may further be configured according to a mutual resonant relationship. When the resonant frequency of the receiver 108 and the resonant frequency of the transmitter 104 are substantially the same or very close, transmission losses between the transmitter 104 and the receiver 108 are reduced. Resonant inductive coupling techniques may allow for improved efficiency and power transfer over various distances and with a variety of inductive coil configurations. When configured according to a mutual resonant relationship, in an implementation, the transmitter 104 outputs a time varying magnetic field with a frequency corresponding to the resonant frequency of the transmit antenna 114. When the receiver 108 is within the wireless field 105, the time varying magnetic field may induce a current in the receive antenna 118. When the receive antenna 118 is configured to resonate at the frequency of the transmit antenna 114, energy may be more efficiently transferred. The alternating current (AC) induced in the receive antenna 118 may be rectified as described above to produce direct current (DC) that may be provided to charge or to power a load (not shown).

Figure 2:
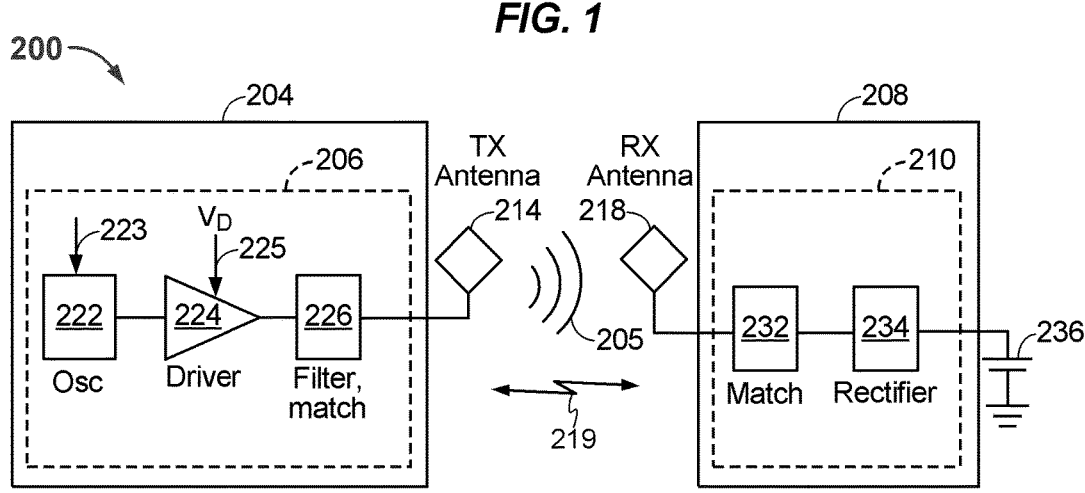
FIG. 2 is a functional block diagram of a wireless power transfer system, in accordance with an exemplary embodiment.

FIG. 2 is a functional block diagram of a wireless power transfer system 200, in accordance with an exemplary implementation. The system 200 includes a transmitter 204 and a receiver 208. The transmitter 204 includes transmit circuitry 206 that includes an oscillator 222, a driver circuit 224, and a filter and matching circuit 226. The oscillator 222 may be configured to generate a signal at a desired frequency that is adjusted in response to a frequency control signal 223. The oscillator 222 provides the oscillator signal to the driver circuit 224. The driver circuit 224 is configured to drive a transmit antenna 214 at, for example, a resonant frequency of the transmit antenna 214 based on an input voltage signal (VD) 225. The driver circuit 224 may be a switching amplifier configured to receive a square wave from the oscillator 222 and output a sine wave or square wave.

The filter and matching circuit 226 filters out harmonics or other unwanted frequencies and match the impedance of the transmitter 204 to the impedance of the transmit antenna 214. As a result of driving the transmit antenna 214, the transmit antenna 214 may generate a wireless field 205 to wirelessly output power at a level sufficient for charging a battery 236, for example.

The receiver 208 includes receive circuitry 210 that includes a matching circuit 232 and a rectifier circuit 234. The matching circuit 232 may match the impedance of the receive circuitry 210 to the impedance of a receive antenna 218. The rectifier circuit 234 may generate a direct current (DC) power output from an alternate current (AC) power input to charge a battery 236. The receiver 208 and the transmitter 204 may additionally communicate on a separate communication channel 219 (e.g., Bluetooth, Zigbee, cellular, etc). The receiver 208 and the transmitter 204 may alternatively communicate via in-band signaling using characteristics of the wireless field 205.

Figure 3:
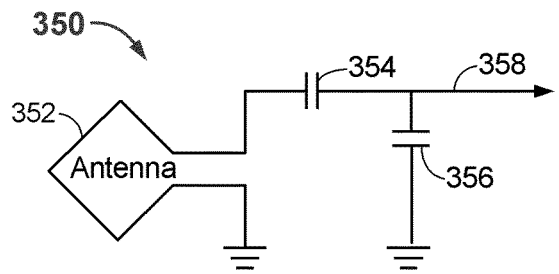
FIG. 3 is a schematic diagram of a portion of transmit circuitry or receive circuitry of FIG. 2 including a transmit or receive antenna, in accordance with an exemplary embodiment.

FIG. 3 is a schematic diagram of a portion of the transmit circuitry 206 or the receive circuitry 210 of FIG. 2, in accordance with exemplary implementations. As illustrated in FIG. 3, transmit or receive circuitry 350 includes an antenna 352. The antenna 352 may also be referred to or be configured as a "loop" antenna 352. The antenna 352 may also be referred to herein or be configured as a "magnetic" antenna or an induction coil. The term "antenna" generally refers to a component that wirelessly outputs or receives energy for coupling to another "antenna." The antenna 352 may also be referred to as a coil or inductor of a type that is configured to wirelessly output or receive power. As used herein, the antenna 352 is an example of a "power transfer component" of a type that is configured to wirelessly output and/or receive power. The antenna 352 may include an air core or a physical core such as a ferrite core (not shown in this figure).

The antenna 352 may form a portion of a resonant circuit configured to resonate at a resonant frequency. The resonant frequency of the loop or magnetic antenna 352 is based on the inductance and capacitance. Inductance may be simply the inductance created by the antenna 352, whereas, a capacitor may be added to create a resonant structure at a desired resonant frequency. As a non-limiting example, a capacitor 354 and a capacitor 356 are added to the transmit or receive circuitry 350 to create a resonant circuit that resonates at a desired frequency of operation. Accordingly, for larger diameter antennas, the size of capacitance needed to sustain resonance may decrease as the diameter or inductance of the loop increases. Other resonant circuits formed using other components are also possible.

As another non-limiting example, a capacitor (not shown) may be placed in parallel between the two terminals of the circuitry 350. For transmit antennas, a signal 358, with a frequency that substantially corresponds to the resonant frequency of the antenna 352, may be an input to the antenna 352. For receive coils, the signal 358 may be the output to the load (not shown).

Figure 4:
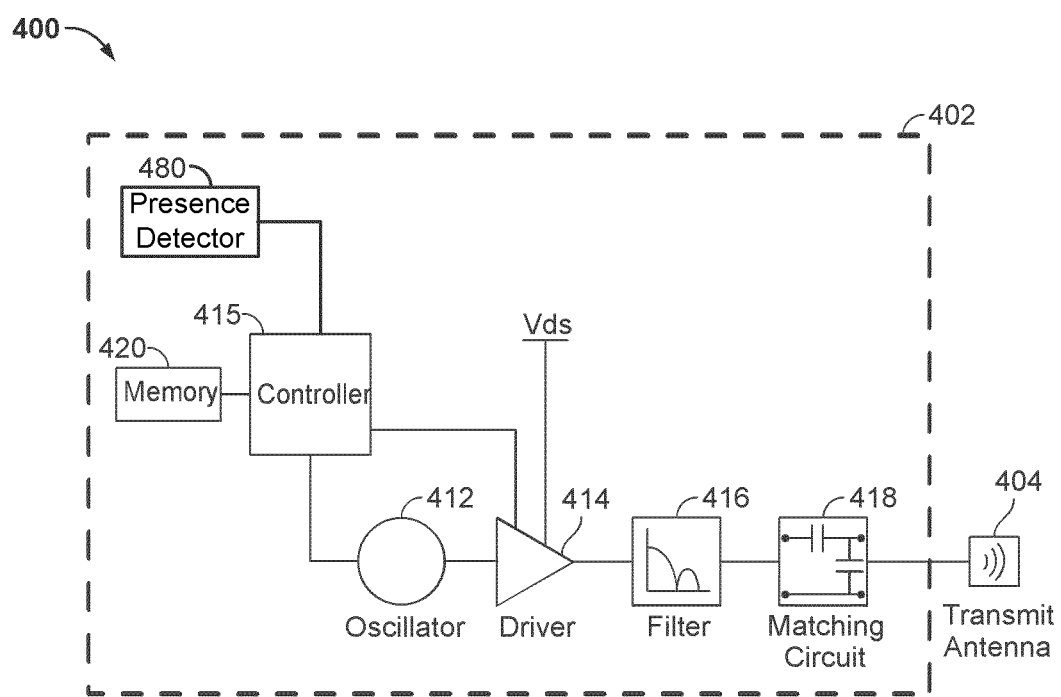
FIG. 4 is a functional block diagram of a transmitter that can be used in the wireless power transfer system of FIG. 1, in accordance with an exemplary embodiment.

FIG. 4 is a simplified functional block diagram of a transmitter 400 that may be used in an inductive power transfer system, in accordance with exemplary implementations of the invention. The transmitter 400 includes transmit circuitry 402 and a transmit antenna 404 operably coupled to the transmit circuitry 402. In some implementations, the transmit antenna 404 is configured as the transmit antenna 214 as described above in reference to FIG. 2. In some implementations, the transmit antenna 404 is or may be referred to as a coil (e.g., an induction coil). In some implementations, the transmit antenna 404 is associated with a larger structure, such as a pad, table, mat, lamp, or other stationary configuration. In some implementations, the transmit antenna 404 is configured to generate an electromagnetic or magnetic field within a charging region. In an exemplary implementation, the transmit antenna 404 is configured to transmit power to a receiver device within the charging region at a power level sufficient to charge or power the receiver device.

The transmit circuitry 402 may receive power through a number of power sources (not shown). The transmit circuitry 402 may include various components configured to drive the transmit antenna 404. In some exemplary implementations, the transmit circuitry 402 may be configured to adjust the transmission of wireless power based on the presence and constitution of the receiver devices, or based on information received from the receiver devices as described herein. As such, the transmit circuitry 402 may provide wireless power efficiently and safely.

The transmit circuitry 402 includes a controller 415. In some implementations, the controller 415 may be a microcontroller or a processor. In other implementations, the controller 415 may be implemented as an application-specific integrated circuit (ASIC). The controller 415 may be operably connected, directly or indirectly, to each component of the transmit circuitry 402. The controller 415 may be further configured to receive information from each of the components of the transmit circuitry 402 and perform calculations based on the received information. The controller 415 may be configured to generate control signals for each of the components that may adjust the operation of that component. As such, the controller 415 may be configured to adjust the power transfer based on a result of the calculations performed by it.

The transmit circuitry 402 further includes a memory 420 operably connected to the controller 415. The memory 420 may comprise random-access memory (RAM), electrically erasable programmable read only memory (EEPROM), flash memory, or non-volatile RAM. The memory 420 may be configured to temporarily or permanently store data for use in read and write operations performed by the controller 415. For example, the memory 420 may be configured to store data generated as a result of the calculations of the controller 415. As such, the memory 420 allows the controller 415 to adjust the transmit circuitry 402 based on changes in the data over time.

The transmit circuitry 402 further includes an oscillator 412 operably connected to the controller 415. In some implementations, the oscillator 412 is configured as the oscillator 222 as described above in reference to FIG. 2. The oscillator 412 may be configured to generate an oscillating signal at the operating frequency of the wireless power transfer. In some implementations, the transmit circuitry 402 is configured to operate at the 6.78 MHz ISM frequency band. The controller 415 may be configured to selectively enable the oscillator 412 during a transmit phase (or duty cycle). The controller 415 may be further configured to adjust the frequency or a phase of the oscillator 412 which may reduce out-of-band emissions, especially when transitioning from one frequency to another. As described above, the transmit circuitry 402 may be configured to provide an amount of charging power to the transmit antenna 404 via the signal, which may generate energy (e.g., magnetic flux) about the transmit antenna 404.

The transmit circuitry 402 further includes a driver circuit 414 operably connected to the controller 415 and the oscillator 412. The driver circuit 414 may be configured as the driver circuit 224 as described above in reference to FIG. 2. The driver circuit 414 may be configured to drive the signals received from the oscillator 412, as described above.

The transmit circuitry 402 further includes a low pass filter (LPF) 416 operably connected to the transmit antenna 404. The low pass filter 416 may be configured as the filter portion of the matching circuit 418 as described above in reference to FIG. 2. In some exemplary implementations, the low pass filter 416 may be configured to receive and filter an analog signal of current and an analog signal of voltage generated by the driver circuit 414. In some implementations, the low pass filter 416 may alter a phase of the analog signals. The low pass filter 416 may cause the same amount of phase change for both the current and the voltage, canceling out the changes. In some implementations, the controller 415 may be configured to compensate for the phase change caused by the low pass filter 416. The low pass filter 416 may be configured to reduce harmonic emissions to levels that may prevent self-jamming. Other exemplary implementations may include different filter topologies, such as notch filters that attenuate specific frequencies while passing others.

The transmit circuitry 402 may further include a fixed impedance matching circuit 418 operably connected to the low pass filter 416 and the transmit antenna 404. The matching circuit 418 may be configured as the matching portion of the filter and matching circuit 226 as described above in reference to FIG. 2. The matching circuit 418 may be configured to match the impedance of the transmit circuitry 402 to the transmit antenna 404. Other exemplary implementations may include an adaptive impedance match that may be varied based on measurable transmit metrics, such as the measured output power to the transmit antenna 404 or a DC current of the driver circuit 414.

The transmitter 400 may need to gather and track information about the whereabouts and status of receiver devices that can be associated with the transmitter 400, or other objects present within a charging field of the transmitter 400. Thus, the transmit circuitry 402 may further include a presence detector 480 connected to the controller 415. The controller 415 can adjust an amount of power delivered by the driver circuit 414 in response to presence signals from the presence detector 480.

The transmit circuitry 402 may further comprise discrete devices, discrete circuits, and/or an integrated assembly of components.

Figure 5:
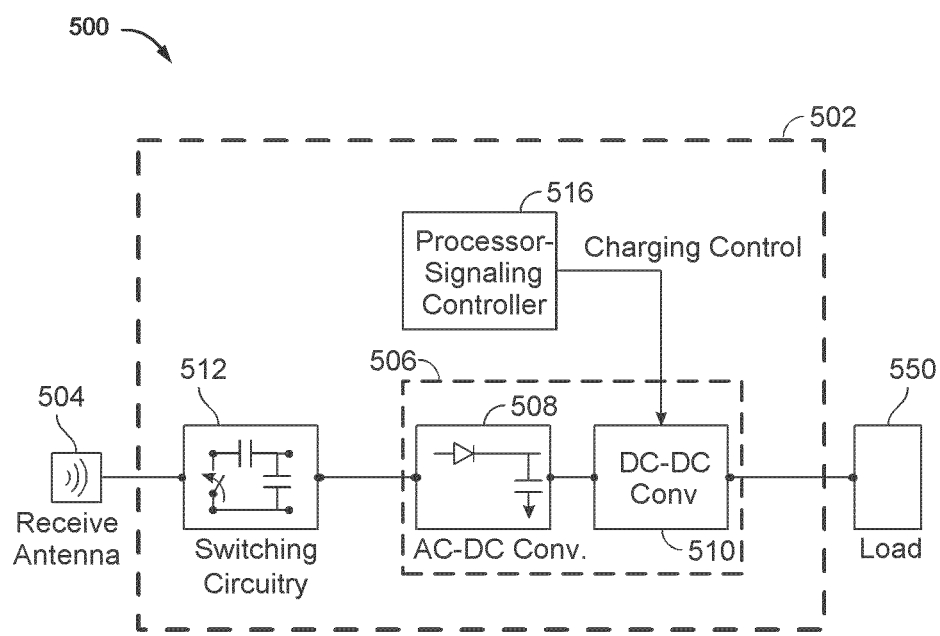
FIG. 5 is a functional block diagram of a receiver that can be used in the wireless power transfer system of FIG. 1, in accordance with an exemplary embodiment.

FIG. 5 is a block diagram of a receiver 500, in accordance with an implementation of the present invention. A receiver 500 includes a receive circuitry 502, a receive antenna 504, and a load 550. The receiver circuitry 502 is electrically coupled to the load 550 for providing received charging power thereto. It should be noted that receiver circuitry 502 is illustrated as being external to load 550 but may be integrated into load 550, or vice versa. The receive antenna 504 is operably connected to the receive circuitry 502. The receive antenna 504 may be configured as the receive antenna 218 as described above in reference to FIGS. 2-3. In some implementations, the receive antenna 504 may be tuned to resonate at a frequency similar to a resonant frequency of the transmit antenna 404, or within a specified range of frequencies, as described above. The receive antenna 504 may be similarly dimensioned with transmit antenna 404 or may be differently sized based upon the dimensions of the load 550. The receive antenna 504 may be configured to couple to a magnetic field generated by the transmit antenna 404 (FIG. 4), as described above, and provide an amount of received energy to the receive circuitry 502 to power or charge the load 550.

The receive circuitry 502 is operably coupled to the receive antenna 504 and the load 550. The receive circuitry may be configured as the receive circuitry 210 as described above in reference to FIG. 2. The impedance presented to the receive antenna by the receive circuitry 502 may be configured to match an impedance of the receive antenna 504 (e.g., via the matching circuit 512) which may increase efficiency. The receive circuitry 502 may be configured to generate power based on the energy received from the receive antenna 504. The receive circuitry 502 may be configured to provide the generated power to the load 550. In some implementations, the receiver 500 may be configured to transmit a signal to the transmitter 400 indicating an amount of power received from the transmitter 400. In some implementations, the receiver 500 may be configured to transmit a signal to the transmitter 400 indicating that the transmitter 400 should alter a characteristic of the wireless charging (e.g., magnetic or electromagnetic) field.

The receive circuitry 502 includes a processor-signaling controller 516 configured to coordinate the processes of the receiver 500.

The receive circuitry 502 includes power conversion circuitry 506 for converting a received energy source into charging power for use by the load 550. The power conversion circuitry 506 includes an AC-to-DC converter 508 coupled to a DC-to-DC converter 510. The AC-to-DC converter 508 rectifies the AC from the receive antenna 504 into DC while the DC-to-DC converter 510 converts the rectified energy signal into an energy potential (e.g., voltage) that is compatible with the load 550. Various AC-to-DC converters are contemplated including partial and full rectifiers, regulators, bridges, doublers, as well as linear and switching converters.

The receive circuitry 502 may further include switching circuitry 512 configured to connect the receive antenna 504 to the power conversion circuitry 506 or alternatively for disconnecting the power conversion circuitry 506 from the receive antenna 504. Disconnecting the receive antenna 504 from the power conversion circuitry 506 not only suspends charging of the load 550, but also changes the "load" as "seen" by the transmitter 400 of FIG. 4.

Figure 6:
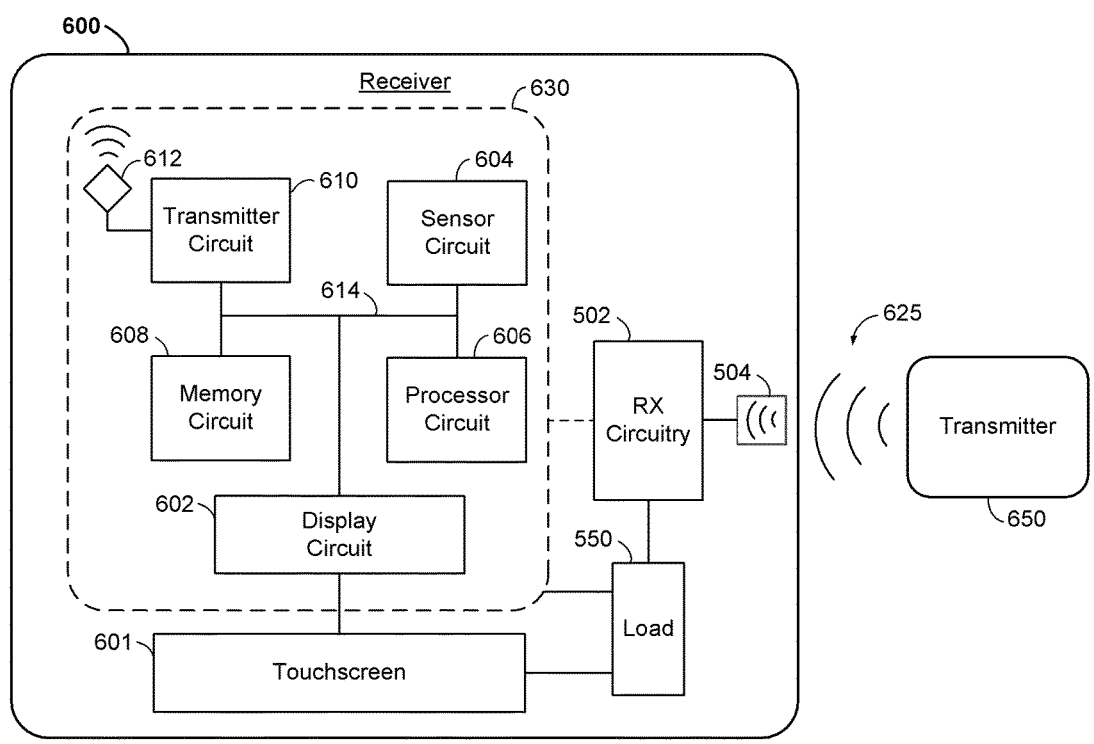
FIG. 6 is a block diagram of a wireless powered device, in accordance with an exemplary embodiment.

FIG. 6 is a block diagram of a wireless power device 600 in accordance with an exemplary embodiment. In some aspects, wireless power device 600 may comprise a portable electronic device.

Wireless power device 600, illustrated as a wireless power receiver, may be configured to receive wireless charging power via a wireless power charging field 625 generated by a wireless power transmitter 650. The wireless power device 600 may be similar to, or may comprise the receive circuitry 502 of FIG. 5. Wireless power transmitter 650 may be similar to transmitter 400 of FIG. 4. As illustrated, wireless power device 600 comprises receive antenna 504, which may be configured to couple to the wireless power charging field 625. As described above, receive antenna 504 may provide an amount of received energy to receive circuitry 502 of wireless power device 600 to power or charge the load 550 of wireless power device 600. Load 550 may be configured to, in turn, provide power to a touchscreen 601 and a touchscreen control circuit 630 of wireless powered device 600. Additionally or alternatively, in one embodiment, receive circuitry 502 (e.g., similarly configured as the receive circuitry 502 of FIG. 5) may be operably coupled to touchscreen control circuit 630. As illustrated, touchscreen control circuit 630 comprises a display circuit 602, a sensor circuit 604, a processor circuit 606, a memory circuit 608, a transmitter circuit 610, and an antenna 612. Also as illustrated, the various components of touchscreen control circuit 630 may be operably connected by bus 614 or some other connection for providing communication therebetween.

As illustrated, touchscreen 601 can be operably connected to display circuit 602. In some aspects, operation of touchscreen 601 may be controlled, at least in part, by display circuit 602. For example, in some aspects, touchscreen 601 may display information and may also receive input through display circuit 602, which may comprise capacitive, acoustic, optoelectronic, or resistive sensors. In some aspects, display circuit 602 may also be referred to as a sensor. In some aspects, display circuit 602 comprises capacitive touchscreen components that form these sensors, such as drive and sense lines. In accordance with these aspects, display circuit 602 may determine whether there has been a touch of the touchscreen 601, and may also determine a location on the touchscreen 601 where the touch has occurred. However, when wireless powered device 600 is placed within a charging region (e.g., within range of the wireless charging field 625) of a wireless power transmitter 650, the wireless charging field 625 generated by the wireless power transmitter 650 may cause interference with the touchscreen 601. In some aspects, display circuit 602 may incorrectly determine that a touch of the touchscreen 601 has occurred due to this interference. In some aspects, this interference may be caused by one or both of a magnetic field component of the wireless charging field 625 (also referred to as the "H-field" or "B-field") or an electrical field component of the wireless charging field 625 (also referred to as the "E-field"). This interference may manifest as "false touches" of the touchscreen 601, jamming of the touchscreen 601, or failure of the touchscreen 601, which may be annoying to a user of the wireless powered device 600. For example, if wireless powered device 600 comprises a wireless cellular telephone, false touches of the touchscreen 601 may result in placing an unintended phone call on the wireless powered device 600.

As the touchscreen 601 may be affected by interference during wireless power transfer, certain aspects of various implementations described herein are related to detecting and mitigating these effects. For example, in various embodiments, wireless powered device 600 may control touchscreen interference caused, at least in part, by the wireless power charging field 625 generated by the wireless power transmitter 650. For instance, in some aspects, wireless powered device 600 may contain additional circuitry, such as touchscreen control circuit 630, to evaluate whether there is interference caused by the wireless charging field 625, and to control the strength of the wireless charging field 625, as described in more detail below.

In accordance with various embodiments, sensor circuit 604 may be used to determine whether there is interference caused by the wireless charging field 625. In some aspects, sensor circuit 604 may comprise a processor. In various aspects, the sensor circuit 604 may be configured to determine whether the wireless charging field 625 is present. Detecting that the wireless charging field 625 is present may indicate that the wireless powered device 600 is receiving wireless charging power (e.g., is in a charging mode). Other methods of determining whether the wireless powered device 600 is receiving wireless charging power may be used. In various embodiments, the wireless powered device 600 may conduct the methods of detecting and mitigating touchscreen interference described herein after detecting that the wireless powered device 600 is receiving wireless charging power.

A perceived "touch" or "contact" of the touchscreen 601 that is caused by the interference may be referred to as a "false touch" or "false contact" of the touchscreen 601. For example, high levels of noise on the sense lines of display circuit 602 (also referred to as "screen noise") may cause a false touch. Accordingly, in some embodiments, sensor circuit 604 may be configured to determine whether the screen noise caused by the wireless charging field 625 causes a false touch. In some aspects, the sensor circuit 604 may also sense the strength of the wireless charging field 625 itself and determine whether the wireless charging field 625 strength is above the limit that would be expected to cause false touches. Additionally, in some aspects, sensor circuit 604 may be configured to determine whether there is a "real" touch of the touchscreen 601. In accordance with one embodiment, sensor circuit 604 may measure a screen noise level when the wireless powered device 600 is not within the wireless charging field 625 and a screen noise level when wireless powered device 600 is placed within the wireless charging field 625. Sensor circuit 604 may then compare these values to determine whether the difference is above a threshold level, which can indicate that a false touch has occurred, or that a false touch is likely to occur. In some embodiments, sensor circuit 604 may measure a screen noise level within wireless powered device 600 when present within the wireless charging field 625, and may compare this value to a threshold value to determine whether the difference is above a threshold level, which can indicate that a false touch has occurred, or that a false touch is likely to occur.

Several potential detection methods, measurements, and thresholds are possible. Each of the potential detection methods, measurements, or thresholds may be utilized individually or in conjunction with each other. For example, in one aspect, the sensor circuit 604 may be configured to measure a level of noise present on all, or substantially all, of the lines of the touchscreen 601. If the level of noise measured on all, or substantially all (e.g., a majority), of the lines of the touchscreen 601 is high (e.g., above some threshold level of noise), then the sensor circuit 604 may be configured to determine that the wireless charging field 625 is causing touchscreen interference. This may be determined because high noise may be unlikely to occur on all or substantially all of the lines of the touchscreen during normal operation. Similarly, in one embodiment, the processor circuit 606 may determine whether a "high" signal is triggered on all or substantially all of the lines of the touchscreen. If so, this may be indicative of touchscreen interference due to the wireless charging field 625. In some aspects, a sensor, such as the sensor circuit 604 or some other circuit not shown, may be placed near the touchscreen 601 or may be comprised of parts of the touchscreen 601, and may be configured to detect the presence or strength of a received field near the touchscreen 601 (e.g., a surface of the touchscreen 601) when the touchscreen 601 is not being actively scanned by the processor circuit 606 or the sensor circuit 604. In accordance with these aspects, the sensor may be configured to measure or determine whether the received field is above a threshold limit.

In some aspects, the sensor circuit 604 may be configured to determine whether some level of noise is present during quiet periods. In accordance with these aspects, a quiet period may refer to a time period when no sensing of actual touches on the touchscreen 601 is expected. For example, actual touches may not be expected when the touchscreen 601 is turned off (e.g., by an application or an operating system of the wireless powered device 600), when the wireless powered device 600 is charging, during a certain period of time after a number of real touches are detected, during a time of day when touches are not expected (e.g., night time or early morning), after a period of time in which no motion of the wireless powered device 600 itself is detected, or any combination of these conditions. In some aspects, these expected quiet times (or any of the thresholds or other values discussed herein) may be based upon statistics of the wireless powered device 600, laboratory/manufacture testing, studies, etc.

In some aspects, the sensor circuit 604 may be configured to determine whether a sense pattern is present that may not otherwise be present or possible during normal operation. For example, a user of the wireless powered device 600 generally may not touch a large area of the touchscreen 601 at one time. Therefore, determining whether a touch is occurring over a large area (e.g., a certain percentage of concurrent sensors) of the touchscreen 601 can indicate that the wireless charging field 625 is causing touchscreen interference. If a determined number or percentage of concurrent sensors exceeds a threshold, then the sensor circuit 604 may make a determination that a false touch has occurred. In some aspects, a user of the wireless powered device 600 may not be able to touch an area of the touchscreen 601 that is smaller than a particular size. For example, a user touching the touchscreen 601 with their finger or a stylus may always activate a plurality of sensors of the touchscreen 601. Accordingly, in an embodiment, the sensor circuit 604 may be configured to determine whether a touch is sensed within an enclosed null or an abnormally small touch area (e.g., a size of a touch area or a number of concurrent sensors being below a threshold value).

In some aspects, the sensor circuit 604 may be configured to determine whether noise at a characteristic frequency is present. In accordance with these aspects, the characteristic frequency may be a fundamental frequency of the wireless power signal, or a harmonic or fraction of the fundamental frequency. In various aspects, the sensor circuit 604 may be configured to determine whether noise at a characteristic periodicity is present. In accordance with these aspects, the periodicity may be related to a beacon rate or adjustment rate of the wireless power transmitter 650. In some aspects, the characteristic periodicity may be specified in beforehand. For example, in one embodiment, the beacon rate may be determined to be periodic 10-30 ms bursts every 250 ms+/−5 ms, with additional 100-110 ms bursts appended every 850-3000 ms. In one embodiment, the adjustment rate can be 250 ms or greater. In some aspects, the wireless power transmitter 650 may adjust the wireless charging field 625 in a predetermined manner so that the wireless powered device 600 may determine whether a characteristic periodicity of noise occurs on the sense lines of the touchscreen 601 during the time of the adjustment. In an embodiment, this adjustment can occur at a predetermined or negotiated time, or according to a predetermined or negotiated time interval (e.g., periodic). In accordance with this embodiment, one or more components of the wireless powered device 600 may negotiate with one or more components of the wireless power transmitter 650.

In some aspects, the sensor circuit 604 may be configured to determine whether a pattern of noise is present in certain areas of the touchscreen 601 known to be susceptible to interference. In some aspects, the sensor circuit 604 may be configured to determine whether the longevity of a touch exceeds a period of time that may otherwise not be present during normal operations (e.g. from a real touch of the touchscreen 601). In some aspects, the sensor circuit 604 may be configured to determine whether the speed of movement of a touch or series of touches occur at an unexpectedly high speed (e.g., above some threshold speed). Similarly, in some aspects, the sensor circuit 604 may be configured to determine whether a long touch or series of touches occur with no movement occurs that would not be otherwise expected during normal operations. In some aspects, the sensor circuit 604 may be configured to determine whether a response persists over varying sensitivity or noise reduction states. For example, the touch controller 606 may be capable of adjusting sensitivity and noise reduction schemes of the touchscreen 601 to determine a fingerprint of the response. This fingerprint can be used to differentiate wireless power interference from real touches, or from other sources of interference, based on whether or not the response persists over a specific pattern of states. In some aspects, the sensor circuit 604 may be configured to determine whether noise manifests as an error on real touches. For example, a location jitter may occur around the actual position or path of an actual touch, and a thus a size of a jitter may be detected, since the marginal signal at the edge of the touch is generally cancelled or reinforced. The existence of this jitter may be determined, and the wireless charging field 625 may be varied accordingly.

In some embodiments, sensor circuit 604 may be configured to determine whether perceived touch signals from the touchscreen 601 are indicative of a series of rapid or successive contacts that occur over a small area of the touchscreen 601. In accordance with these embodiments, sensor circuit 604 may determine, based on information about the perceived touch signals, whether a false touch has occurred. Sensing this form of false touch is described in further detail below with respect to FIG. 7A.

In some embodiments, sensor circuit 604 may be configured to determine whether perceived touch signal(s) from the touchscreen 601 are indicative of a constant contact that occurs on a specific area of the touchscreen 601. In accordance with these embodiments, sensor circuit 604 may determine, based on information about the perceived touch signal(s), whether a false touch has occurred. Sensing this form of false touch is described in further detail below with respect to FIG. 7B.

In some aspects, upon determining that interference (e.g., a false touch) is caused by the wireless charging field 625, sensor circuit 604 may provide a signal to the processor circuit 606 indicating that the interference has occurred. Sensor circuit 604 may also provide additional information relating to the interference, such as a type of interference (e.g., a false touch caused by screen a measured level of screen noise), the duration of the interference, etc. In some aspects, sensor circuit 604 may be physically separate from processor circuit 606, or the two may be integrated into a single processor (not illustrated).

Processor circuit 606 may be used to control the operation of display circuit 602, sensor circuit 604, memory circuit 608, transmitter circuit 610, or antenna 612. In various aspects, processor circuit 606 may be a dedicated controller, or may be part of a general processor. In some aspects, processor circuit 606 may only operate when wireless powered device 600 is within a wireless charging field 625, in order to conserve power or otherwise reduce stress on the components of wireless powered device 600. In accordance with various embodiments, processor circuit 606 may be used to control the strength of the wireless charging field 625. In these embodiments, processor circuit 606 can receive an indication from the sensor circuit 606 that touchscreen interference (e.g., a false touch) has occurred based in part on the wireless charging field 625, and can thereafter provide a signal to the transmitter circuitry 610 to transmit a message to the wireless power transmitter 650 generating the wireless charging field 625. In some aspects, the message can indicate to the wireless power transmitter 650 to lower a strength or magnitude of the wireless charging field 625. In various aspects, lowering the strength of the wireless charging field 625 can comprise lowering the strength of the H-field, the E-field, or both. Processor circuit 606 may simply indicate that the wireless charging field 625 is to be reduced, or may indicate a value by which the strength of the wireless charging field 625 is to be reduced. This value can be derived from the information determined by the sensor circuit 604 in its evaluation of whether a false touch or other interference has occurred. For example, in some aspects, the sensor circuit 604 may be configured to detect the level of interference (e.g., the level of a signal seen by the touchscreen 601 or processor circuit 606 once a false touch is detected) and compare the detected interference to a predetermined wireless charging field 625 strength level that allows normal operation (e.g., operation without a false touch). In accordance with these aspects, the comparison may comprise subtracting the two values to obtain a level of a jamming signal. This value can represent a level by which the wireless charging field 625 has to be reduced to return to normal operation. By knowing information about the coupling of the system beforehand (e.g., via testing) the wireless powered device 600 can then instruct the wireless power transmitter 650 to reduce the wireless charging field 625 by the determined value, or by another value that is based at least in part upon the determined value. In various aspects, once the wireless powered device 600 determines that touchscreen interference is caused by the wireless charging field 625, a user interface (not illustrated) of the wireless powered device 600 may provide an indication to the user of the wireless powered device 600 that the interference is occurring.

In some aspects, the touchscreen 601 may continue to experience false touches or other touchscreen interferences, even after the strength of the wireless charging field 625 has been lowered. In accordance with these aspects, wireless powered device 600 may continue to determine whether these touchscreen interferences are occurring, and may further instruct the wireless power transmitter 650 to lower the strength of the wireless charging field 625 if the interference is detected. However, if the strength of the wireless charging field 625 continues to decrease, this can decrease the voltage received, and thereby decrease a rate at which wireless powered device 600 is charged. If this reduction process is repeated, the strength of the wireless charging field 625 may become too low, and the charging of wireless powered device 600 may become inefficient. Accordingly, in one embodiment, a manufacturer or designer of wireless powered device 600 may choose a minimum strength level at which the wireless charging field should operate. In accordance with this embodiment, processor circuit 606 may determine whether to instruct the wireless power transmitter 650 to lower the strength of the wireless charging field 625 based upon whether the current strength of the wireless charging field 625 is at or below the minimum strength level. Wireless powered device 600 may estimate the current strength of the wireless charging field 625 based on the field estimation methods described herein, or based on some other method.

In some aspects, when wireless powered device 600 is placed within the wireless charging field 625 at a time when another wireless powered device is already present within the wireless charging field 625, a characteristic of the wireless charging field 625 may be altered by the presence of wireless powered device 600, or an impact of the wireless charging field 625 on the other wireless powered device may be altered. In accordance with these aspects, the wireless charging field 625 may no longer be at an optimal level. For example, when wireless powered device 600 is placed within the wireless charging field 625, the strength of the wireless charging field 625 (or the strength of the wireless charging field 625 perceived by the other wireless powered device) may change to a lower level than a level at which the wireless charging field 625 does not cause interference in the other wireless powered device (e.g., does not cause false touches).

In some aspects, the strength of the wireless charging field 625 may be too low to efficiently charge wireless powered device 600. Therefore, wireless powered device 600 may signal to the wireless power transmitter 650 to increase the strength or magnitude of the wireless charging field 625. Wireless powered device 600 may periodically or may dynamically determine when to transmit this signal, such as when a fixed period of time elapses, when another wireless powered device is detected, when a power draw changes, or based on an estimate of the strength of the wireless charging field 625. As an example, if the wirelessly powered device 600 is inductively coupled to the wireless power transmitter 650, and sees its rectified receiver voltage drop below a level that allows full rate charging, the wirelessly powered device 600 might request that the wireless power transmitter 650 increase the current (e.g., in a resonator coil of the wireless power transmitter 650). For example, lithium-ion batteries may have a full-charge voltage of around 4.2 volts. Therefore, if the rectified receiver voltage dropped below 4.2 volts, a full charge may not be possible. In various aspects, increasing the strength of the wireless charging field 625 can comprise increasing the strength or magnitude of the H-field, the E-field, or both. In some aspects, a message indicating that the wireless power transmitter 650 is to increase the strength of the wireless charging field 625 may be delayed, suppressed, or otherwise not sent when the wireless powered device 600 is still observing, or has recently observed, false touches or other touchscreen interferences.

In some aspects, wireless powered device 600 may be in communication with the wireless power transmitter 650 and other wireless powered devices present in the charging area. In accordance with these aspects, wireless powered device 600 may communicate with the other devices to determine whether to instruct the wireless power transmitter 650 to increase the strength of the wireless charging field 625. In some aspects, the wireless power transmitter 650 may be configured to ignore instructions to increase or decrease the strength of the wireless charging field 625 based on previously received information, or based on some other considerations. For example, if the wireless power transmitter 650 receives an indication from the wireless powered device 600 that the wireless charging field 625 is causing touchscreen interference, the wireless power transmitter 650 may ignore other similar indications that it receives within a predetermined time thereafter. As a non-limiting example of a benefit of the techniques for altering a characteristic of the wireless charging field 625 described herein, a wireless powered device may be able to receive wireless power at an optimal level. The optimal level may be a level at which sufficient wireless power is received by the wireless powered device and a minimal level of touchscreen interferences occur. As this optimal level can be device specific, a tradeoff between these two issues may be decided by the manufacturer or designer of the device.

In some aspects, field estimation techniques may be used in addition to, or alternatively from, the methods of detecting touchscreen interference described herein. In accordance with these aspects, sensor circuit 604, processor circuit 606, or both may be used to estimate a strength of the wireless charging field 625 generated by the wireless power transmitter 650. In some aspects, field estimation can be based on one or more of a receiver voltage, a transmitter type or state, a level of power drawn by the receiver (e.g., wireless powered device 600 configured to receive wireless power), or a separate sensing resonator. Receiver voltage may be an indirect measurement of the strength of the wireless charging field 625, which can be estimated by the sensor circuit 604. Transmitter type or state may comprise a make, model, size, etc. of the wireless power transmitter 650 or information indicative of a state of the transmitter, such as a power state. This information may be explicitly communicated by the wireless power transmitter 650 itself, or may be implicitly determined by the wireless powered device 600. This information may aid in field estimation, as a smaller wireless power transmitter 650 may have less of a "free" field, which may indicate a higher field strength. The level of power drawn by the receiver may be estimated by the sensor circuit 604. The drawn power level may aid in field estimation, as a higher level of power drawn by the receiver at the same receiver voltage can indicate a higher field strength.

Once one or more of these parameters are determined, they may be used to estimate a strength of the wireless charging field 625. In one embodiment, sensor circuit 604 may estimate the strength of the wireless charging field 625 and provide a value indicative of the strength to processor circuit 606. As an example, an open circuit AC (not illustrated) voltage within the wireless powered device 600 may be directly proportional to the field strength. Thus a separate sense coil (not shown) within the wireless powered device 600 may provide an accurate measurement of field strength. Similar measurements can be accomplished with other circuits of the wireless powered device 600, but these measurements may be less accurate since DC loading, combined with the inevitable resistive losses in the receiver circuitry 502 (e.g., within a receiver resonator or other receiver components) can dilute the accuracy of the voltage signal. In some aspects, if a coil resistance and load are known, they can be used to increase the accuracy of field estimation. For example, the field strength can be proportional to the voltage plus the calculated coil current times the coil resistance. For dedicated sensors, the voltage can be proportional to the field strength. In some embodiments, the sensor circuit 604 may be placed in proximity to known susceptible areas to improve specificity of the detection. Processor circuit 606 may compare a value of the estimated field against a threshold value to determine whether the strength of the wireless charging field 625 is at or above a value that allows for good touchscreen performance. Good touchscreen performance may be indicative of a state at which a minimal number of interferences are caused by the wireless charging field 625. Although this minimal number may be zero, it may be the case that, for some wireless powered devices, receiving wireless power at a level where no interference exists is too low of a power level to efficiently charge the device. Accordingly, the manufacturer of wireless powered device 600 may determine, based at least in part upon this tradeoff, what may be considered "good" performance, and set the threshold value accordingly. In some aspects, the threshold value can be determined ahead of time by lab testing. In some embodiments, the value indicative of the strength of the wireless charging field 625 may comprise more than one component, and a lookup table may be used to determine whether the strength of the wireless charging field 625 is above the threshold based on a comparison of each component of the strength. The data points of the lookup table may be generated based on lab testing, and additional points may be interpolated or dynamically determined during the operation of wireless powered device 600.

In some aspects, upon determining that the estimated field is above the threshold value, processor circuit 606 may instruct the wireless power transmitter 650 to lower the strength or magnitude of the wireless charging field 625. In one aspect, sensor circuit 604 may estimate the strength of the wireless charging field 625 after the instruction is provided. In one aspect, sensor circuit 604 may wait for a period of time before performing each subsequent estimate. If the processor circuit 606 determines that the subsequent estimate is above the threshold value, it may again instruct the wireless power transmitter 650 to lower the strength of the wireless charging field 625. This process may repeat until the estimated strength of the wireless charging field 625 is at or below the threshold value. However, even though the estimated strength of the wireless charging field 625 may be determined to be at or below the threshold value, the strength of the wireless charging field 625 may vary. For example, placing an additional wireless powered device within the wireless charging field 625, or removing another wireless powered device from the wireless charging field 625 may alter a characteristic of the field. Accordingly, in one aspect, sensor circuit 604 may periodically estimate the strength of the wireless charging field 625, regardless of whether it was previously determined that the estimated strength of the wireless charging field 625 was at or below the threshold value. In accordance with this aspect, the sensor circuit 604 may detect a change in a characteristic of the wireless charging field 625 indicative of another wireless power device entering or leaving the wireless charging field, and transmit an indication to the wireless power transmitter 650 to increase or decrease the strength of the wireless charging field 625. As a non-limiting example of a benefit of these implementations, a wireless powered device may be able to receive wireless power at a level at which sufficient wireless power is received and a minimal level of touchscreen interferences occur. One additional benefit provided may be the simplicity of reaching this optimal performance level, as a wireless powered device may instruct a wireless power transmitter 650 to generate a wireless charging field 625 at a predetermined strength upon entry into the charging area.

Memory circuit 608 may be used to store information relating to touchscreen interference. For example, memory circuit 608 may store information relating to false touches of the touchscreen 601 or to field strength thresholds. This information may be stored by factory default, may be provided during an update of the wireless powered device 600, or may be dynamically stored during the operation of the wireless powered device 600. In some aspects, the stored information may be used as a reference point for determining whether a touchscreen interference is occurring. For example, the occurrence of a false touch may manifest itself in different ways depending upon the size, shape, components, configuration, etc. of the wireless powered device 600. In accordance with these aspects, sensor circuit 604 may access the information stored in the memory circuit 608 to determine whether a perceived touch, contact, or series of touches or contacts should be interpreted as a false touch. In some aspects, memory circuit 608 may be used to store the various minimum, maximum, or other threshold values described herein.

Transmitter circuit 610 may be used to provide a signal to a wireless power transmitter 650. In various embodiments, transmitter circuit 610 can utilize antenna 612 to wirelessly provide this signal. In some aspects, transmitter circuit 610 may be configured to communicate with the wireless power transmitter 650 in accordance with Bluetooth, zigbee, Wi-Fi, cellular, or other protocols. In some embodiments, transmitter circuit 610 may be configured to alter a characteristic of the wireless charging field in order to communicate with the wireless power transmitter 650. In several embodiments, the signal provided to the wireless power transmitter 650 can indicate to the wireless power transmitter 650 that it is to alter a characteristic of the wireless charging field 625. In one embodiment, altering the characteristic of the wireless charging field 625 can comprise decreasing the strength or magnitude of the wireless charging field 625.

As a non-limiting example of a benefit of the configurations described above wireless powered device 600 may efficiently determine whether touchscreen interference is being caused by a wireless charging field 625, and may communicate with a wireless power transmitter 650 to lower or increase a strength of the wireless charging field 625 to a level where no (or a minimal number of) touchscreen interferences occur.

Figure 7A:
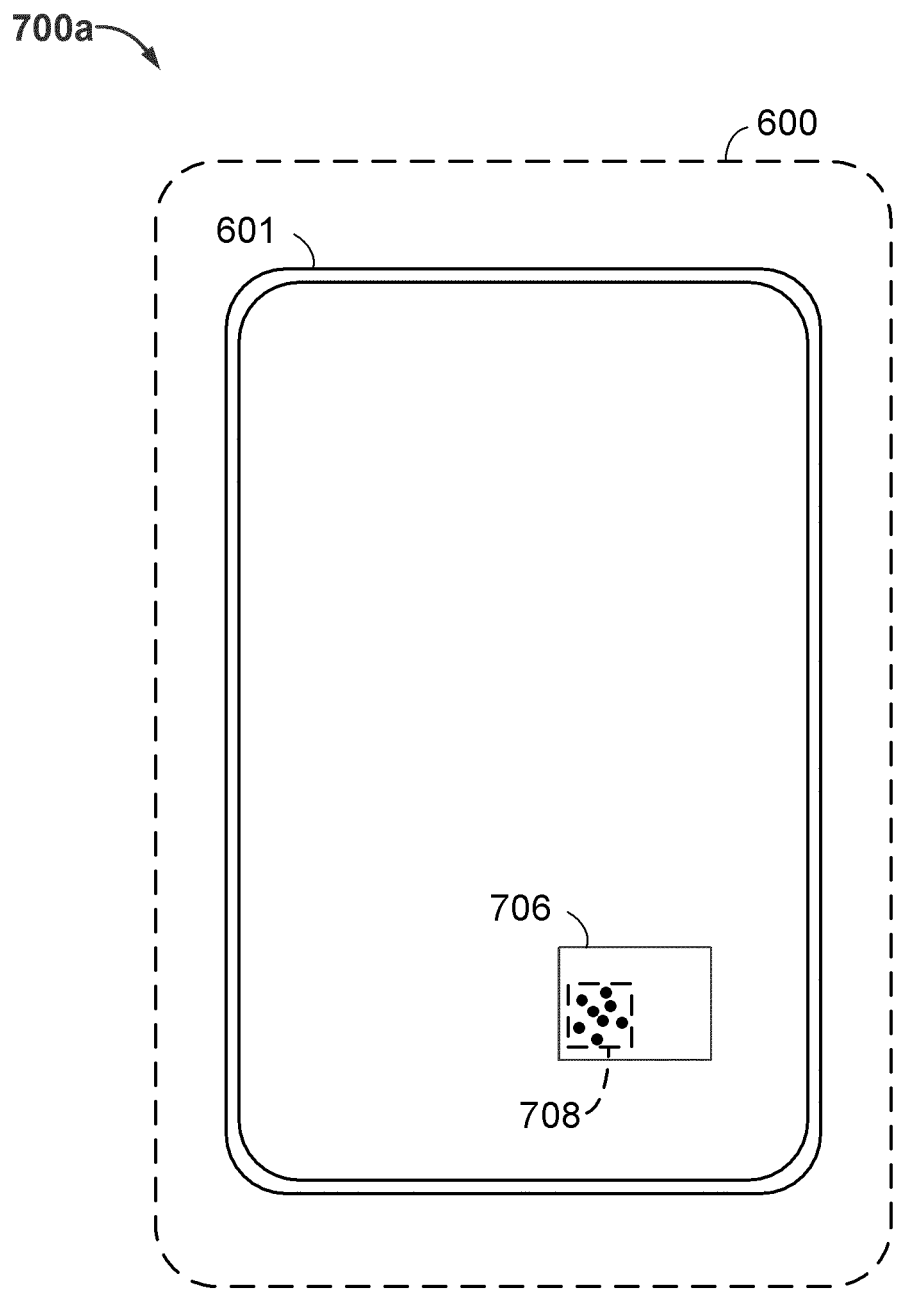
FIG. 7A is an illustration of an exemplary false touch pattern, in accordance with an exemplary embodiment.

FIG. 7A illustrates an exemplary false touch pattern 700*a*, in accordance with an exemplary embodiment. FIG. 7A illustrates the wireless powered device 600 from a top-down view of the touchscreen 601. As illustrated, a plurality of contacts 708 may occur within a portion 706 of touchscreen 601. Wireless powered device 600 may regard any contacts that occur outside of portion 706 as normal (e.g., not false touches). The size or shape of portion 706 may vary based upon the size, shape, components, configuration, etc. of the wireless powered device 600. For example, a manufacturer or designer of wireless powered device 600 may observe that false touches of the touchscreen 601 only occur within a small area, such as a 1 cm×1 cm area of the touchscreen 601. Accordingly, the manufacturer may set the size of portion 706 to 1 cm×1 cm, so that wireless powered device 600 reduces the likelihood of improperly determining that a false touch has occurred. However, the rate at which the plurality of contacts 708 occurs may vary (e.g., anywhere from one touch every few seconds to dozens per second), and the area over which the false touch may also vary (e.g., anywhere from the bottom third of the touchscreen 601 to a very small specific area) from one device to another. Although portion 706 is illustrated as a specific portion of the touchscreen 601, portion 706 may otherwise comprise a distance between two or more contact points that wireless powered device 600 considers as being within a tolerable range indicative of a false touch. Further, any numerical values provided herein are simply provided as demonstrative examples, and should not be construed as limiting the breadth of the application, as there may be a large number of possible values.

Similarly, the number of perceived touches or the time between each of the perceived touches for the wireless powered device 600 to perceive the plurality of contacts 708 as a false touch may vary from device to device. For example, a manufacturer of wireless powered device 600 may observe that false touches of the touchscreen 601 generally occur when at least five contacts occur over a period of one second. The manufacturer may set tolerable time and quantity ranges for determining whether a false touch has occurred accordingly. In some aspects, the area over which the contacts occur (or the distance between), the number of contacts, the time between the contacts, or some combination thereof may be referred to as a "signature" of a false touch. It will be appreciated by one of skill in the art that a number of false touch signatures are possible, and that the false touch signatures may be device specific. Accordingly, what wireless powered device 600 may determine is a false touch may not be determined to be a false touch by another wireless powered device. In some aspects, known false touch signatures can be stored within wireless powered device 600. In some aspects, a pattern of perceived touches may indicate false touches. In accordance with these aspects, if false touches are often confined to one area of the touchscreen 601, and do not follow the same pattern of use that touchscreens normally follow, then these patterns may be classified as false touches. For example, repeated attempts to use the emergency dialer to dial the number 99999999999 would likely be the result of false touches, since false touches in a localized area (such as the area over the displayed "9" on the dialer) may be common, while users that dial such numbers are not. Accordingly, in some aspects, the sensor circuit 604 or the processor circuit 606 of the wireless powered device 600 may be configured to determine whether a pattern of data indicated by a series of touches is indicative of a false touch.

Figure 7B:
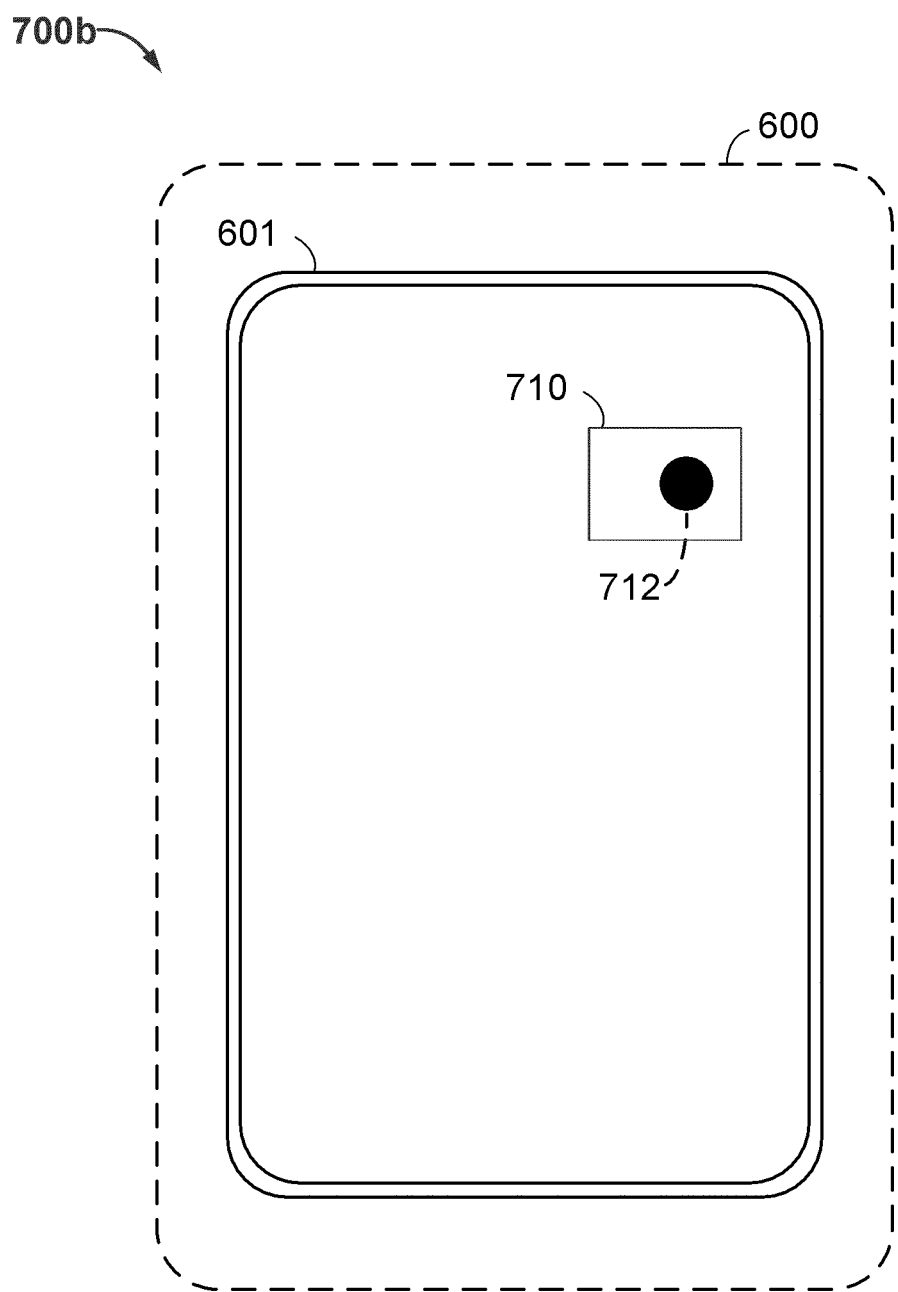
FIG. 7B is another illustration of an exemplary false touch pattern, in accordance with an exemplary embodiment.

FIG. 7B illustrates another exemplary false touch pattern 700*b*, in accordance with an exemplary embodiment. FIG. 7B illustrates the wireless powered device 600 from a top-down view of the touchscreen 601. Similar to FIG. 7A, wireless powered device 600 may regard any contacts that occur outside of portion 710 as normal (e.g., not false touches), the size or shape of portion 710 may vary, and portion 710 may otherwise comprise a distance between two or more contact points that wireless powered device 600 considers as being within a range indicative of a false touch. Contact 712 may be a constant touch that occurs for some duration of time. Contact 712 may span multiple sensors of the touchscreen 601, and at least a portion of the multiple sensors may be located next to one another. By way of example, a manufacturer of wireless powered device 600 may determine that a constant touch of half of the sensors in a 2 cm×2 cm area for fifteen seconds indicates a false touch. Accordingly, wireless powered device 600 may be configured to determine that a false touch has occurred, given these constraints. Similar to the false touch pattern 700*a* of FIG. 7A, the duration of the contact 712, the size of portion 710, the area over which contact 712 actually occurs, the number of sensors triggered by the contact 712, the proximity of the triggered sensors to one another, or some combination thereof may comprise a signature of a false touch. These signatures can be device specific. For example, in some devices, interference may be concentrated along the edges or in corners of the touchscreen 601. If this information is known ahead of time, a wireless powered device 600 may be configured to detect this occurrence and mitigate its effect, as described herein.

In some aspects, a false touch may cause a perceived contact of the touchscreen 601 in more than one portion 710, which could mean that restricting false touch signatures to contact(s) that occur(s) within a limited distance would not encompass this false touch signature. Accordingly, a manufacturer of wireless powered device 600 may determine whether this occurs by testing wireless powered device 600 under various conditions, and may design wireless powered device 600 so that it is capable of detecting this signature. Although various examples are given with respect to what a manufacturer of wireless powered device 600 may determine, it should be appreciated that other determinations are possible. For example, wireless powered device 600 may be configured to dynamically determine what comprises a false touch. In some aspects, wireless powered device 600 utilizes a lookup table of false touch signatures and wireless powered device 600 is configured to interpolate additional signatures based on these known signatures, information obtained during operation, or both. As a non-limiting example of a benefit of these configurations, a wireless powered device may be able to determine that a wireless charging field (e.g., wireless charging field 625 illustrated in FIG. 6) is causing interference with a touchscreen 601 of the wireless powered device 600, and may also be able to determine information related to the interference. This information may be used to aid in the detection or mitigation of interference in the future.

Figure 8:
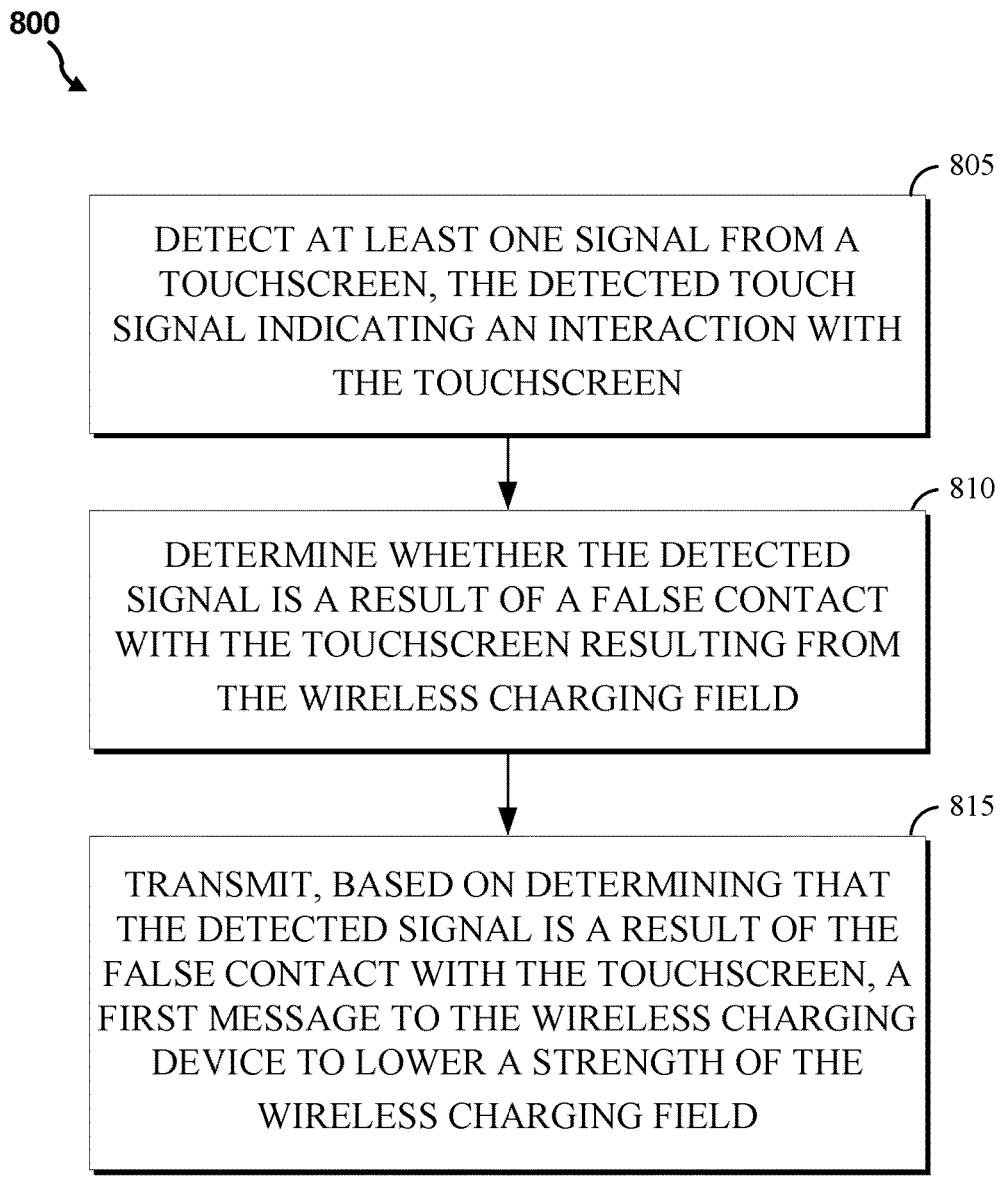
FIG. 8 is a flowchart of an exemplary method for receiving charging power via a wireless charging field of a wireless charging device.

FIG. 8 is a flowchart of an exemplary method 800 for receiving charging power via a wireless charging field of a wireless charging device, in accordance with an exemplary embodiment. In some aspects, the method 800 may be used for controlling touchscreen interferences. In one aspect, the method 800 may be performed by a wireless power device, such as the wireless power device 600 of FIG. 6. In some aspects, the wireless charging device may comprise the wireless power transmitter 650 of FIG. 6.

Method 800 may start at block 805, where a sensor circuit of the wireless power device detects at least one signal from a touchscreen, the detected signal indicating an interaction with the touchscreen. In some aspects, the sensor circuit of the wireless power device is further configured to measure a noise level.

Method 800 may then move to block 810, where a processor circuit of the wireless power device determines whether the detected signal is a result of a false contact with the touchscreen resulting from the wireless charging field. In some aspects, the processor circuit of the wireless power device is further configured to determine that the detected at least one signal is indicative of successive contacts occurring on the touchscreen within a predetermined or threshold distance from each other. In some aspects, the processor circuit of the wireless power device is further configured to determine that the detected at least one signal is indicative of successive contacts occurring on the touchscreen within a predetermined area or areas. In various aspects, the processor circuit of the wireless power device may additionally or alternatively be further configured to determine that the detected at least one signal is indicative of a continuous contact that exceeds a threshold duration occurring on the touchscreen. In one embodiment, the processor circuit of the wireless power device is further configured to determine whether a measured noise level exceeds a threshold. In one aspect, the processor circuit of the wireless power device is further configured to estimate a strength of the wireless charging field, which may be based at least in part on one or more of a voltage level received by the wireless power receiver, a type of transmitter within the wireless charging device, and a power drawn by the wireless power receiver. In various embodiments, the wireless power device may determine whether the detected signal is a result of any interference with the touchscreen resulting from the wireless charging field, as described herein, which may or may not include a false contact with the touchscreen.

Method 800 may then move to block 815, where a transmitter transmits, based on determining whether the detected signal is a result of the false contact with the touchscreen, a first message to the wireless charging device to lower a strength of the wireless charging field. In one aspect, the transmitter circuit of the wireless power device is further configured to transmit, based whether a measured noise level exceeds a threshold, a second message to the wireless charging device to lower the strength of the wireless charging field. In some aspects, the transmitter circuit of the wireless power device is further configured to transmit, based on an estimate of the strength of the wireless charging field, a second message to the wireless charging device to lower the strength of the wireless charging field to a threshold level. In accordance with these aspects, the threshold level may be a ratio, which may be based at least in part upon a distance between the wireless power device and the wireless charging device.

Optionally, method 800 may further include detecting, by the sensor circuit of the wireless power device, a change in a characteristic of the wireless charging field indicative of another wireless power device entering the wireless charging field. Accordingly, in one aspect, the processor circuit of the wireless power device may be further configured to estimate the strength of the wireless charging field, and the transmitter circuit of the wireless power device may be further configured to transmit, based on the estimate of the strength of the wireless charging field, a second message to the wireless charging device to increase the strength of the wireless charging field.

The various operations of methods described above can be performed by any suitable means capable of performing the operations, such as various hardware and/or software component(s), circuits, and/or module(s). Generally, any operations illustrated in the Figures can be performed by corresponding functional means capable of performing the operations. For instance, in various aspects, means for detecting or means for measuring may comprise a sensor circuit, such as one or more of the touchscreen 601, the touchscreen control circuit 630, the display circuit 602, the sensor circuit 604, the processor circuit 606, the memory circuit 608, or their functional equivalents, as described herein. In some aspects, the various means for determining or the means for estimating may individually or collectively comprise one or more processing circuits, such as one or more of the touchscreen control circuit 630, the display circuit 602, the sensor circuit 604, the processor circuit 606, the memory circuit 608, or their functional equivalents, as described herein. In various aspects, means for transmitting may comprise a transmitter circuit, such as one or more of the transmitter circuit 610, the antenna 612, or their functional equivalents, as described herein.

Information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative logical blocks, modules, circuits, and algorithm steps described in connection with the embodiments disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the embodiments of the invention.

The various illustrative blocks, modules, and circuits described in connection with the embodiments disclosed herein can be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein can be embodied directly in hardware, in a software module executed by a processor, or in a combination of the two. If implemented in software, the functions can be stored on or transmitted over as one or more instructions or code on a tangible, non-transitory computer-readable medium. A software module can reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium can be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium can reside in an ASIC.

For purposes of summarizing the disclosure, certain aspects, advantages and novel features of the inventions have been described herein. It is to be understood that not necessarily all such advantages can be achieved in accordance with any particular embodiment of the invention. Thus, the invention can be embodied or carried out in a manner that achieves or optimizes one advantage or group of advantages as taught herein without necessarily achieving other advantages as can be taught or suggested herein.

Various modifications of the above described embodiments will be readily apparent, and the generic principles defined herein can be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless power device for receiving charging power via a wireless charging field of a wireless charging device, the wireless power device comprising:
   a sensor circuit configured to detect at least one signal from a touchscreen, the detected at least one signal indicating an interaction with the touchscreen;
   a processor circuit configured to determine whether the detected at least one signal is a result of a false contact with the touchscreen resulting from the wireless charging field; and
   a transmitter circuit configured to transmit, based on determining that the detected at least one signal is a result of the false contact with the touchscreen, a first message to the wireless charging device to lower a strength of the wireless charging field.

2. The wireless power device of claim 1, wherein the processor circuit is further configured to determine that the detected at least one signal is the result of the false contact in response to determining that the detected at least one signal is indicative of a series of successive contacts occurring on the touchscreen within a predetermined distance from each other.

3. The wireless power device of claim 1, wherein the processor circuit is further configured to determine that the detected at least one signal is the result of the false contact in response to determining that the detected at least one signal is indicative of a series of successive contacts occurring on the touchscreen within a predetermined area.

4. The wireless power device of claim 1, wherein the processor circuit is further configured to determine that the detected at least one signal is the result of the false contact in response to determining that the detected at least one signal is indicative of a continuous contact that exceeds a threshold duration occurring on the touchscreen.

5. The wireless power device of claim 1, wherein:
   the sensor circuit is further configured to measure a noise level of the touchscreen, and wherein
   the processor circuit is further configured to determine whether the measured noise level exceeds a threshold.

6. The wireless power device of claim 5, wherein the transmitter circuit is further configured to transmit, based on whether the measured noise level exceeds the threshold, a second message to the wireless charging device to lower the strength of the wireless charging field.

7. The wireless power device of claim 1, wherein:
   the processor circuit is further configured to estimate the strength of the wireless charging field, and wherein
   the transmitter circuit is further configured to transmit, based on the estimated strength of the wireless charging field, a second message to the wireless charging device to lower the strength of the wireless charging field to a threshold level.

8. The wireless power device of claim 7, wherein the processor circuit is further configured to estimate the strength of the wireless charging field based at least in part on one or more of:
   a voltage level received by a wireless power receiver,
   a type of transmitter within the wireless charging device, and
   a power drawn by the wireless power receiver.

9. The wireless power device of claim 1, wherein:
   the sensor circuit is further configured to detect a change in a characteristic of the wireless charging field indicative of another wireless power device entering the wireless charging field, wherein
   the processor circuit is further configured to estimate the strength of the wireless charging field, and wherein
   the transmitter circuit is further configured to transmit, based on the estimated strength of the wireless charging field, a second message to the wireless charging device to increase the strength of the wireless charging field.

10. A method for receiving charging power via a wireless charging field of a wireless charging device, the method comprising:
    detecting at least one signal from a touchscreen, the detected at least one signal indicating an interaction with the touchscreen;
    determining whether the detected at least one signal is a result of a false contact with the touchscreen resulting from the wireless charging field; and
    transmitting, based on determining that the detected at least one signal is a result of the false contact with the touchscreen, a first message to the wireless charging device to lower a strength of the wireless charging field.

11. The method of claim 10, further comprising:
    determining that the detected at least one signal is the result of the false contact in response to determining that the detected at least one signal is indicative of a series of successive contacts occurring on the touchscreen within a predetermined distance from each other.

12. The method of claim 10, further comprising:
determining that the detected at least one signal is the result of the false contact in response to determining that the detected at least one signal is indicative of a series of successive contacts occurring on the touchscreen within a predetermined area.

13. The method of claim 10, further comprising:
determining that the detected at least one signal is the result of the false contact in response to determining that the detected at least one signal is indicative of a continuous contact that exceeds a threshold duration occurring on the touchscreen.

14. The method of claim 10, further comprising:
measuring a noise level of the touchscreen; and
determining whether the measured noise level exceeds a threshold.

15. The method of claim 14, further comprising:
transmitting, based on whether the measured noise level exceeds the threshold, a second message to the wireless charging device to lower the strength of the wireless charging field.

16. The method of claim 10, further comprising:
estimating the strength of the wireless charging field; and
transmitting, based on the estimated strength of the wireless charging field, a second message to the wireless charging device to lower the strength of the wireless charging field to a threshold level.

17. The method of claim 16, further comprising:
estimating the strength of the wireless charging field based at least in part on one or more of:
a voltage level received by a wireless power receiver,
a type of transmitter within the wireless charging device, and
a power drawn by the wireless power receiver.

18. The method of claim 10, further comprising:
detecting a change in a characteristic of the wireless charging field indicative of another wireless power device entering the wireless charging field;
estimating the strength of the wireless charging field; and
transmitting, based on the estimated strength of the wireless charging field, a second message to the wireless charging device to increase the strength of the wireless charging field.

19. A wireless power device for receiving charging power via a wireless charging field of a wireless charging device, the wireless power device comprising:
means for detecting at least one signal from a touchscreen, the detected at least one signal indicating an interaction with the touchscreen;
means for determining whether the detected at least one signal is a result of a false contact with the touchscreen resulting from the wireless charging field; and
means for transmitting, based on determining that the detected at least one signal is a result of the false contact with the touchscreen, a first message to the wireless charging device to lower a strength of the wireless charging field.

20. The wireless power device of claim 19, further comprising:
means for determining that the detected at least one signal is the result of the false contact in response to determining that the detected at least one signal is indicative of a series of successive contacts occurring on the touchscreen within a predetermined distance from each other.

21. The wireless power device of claim 19, further comprising:
means for determining that the detected at least one signal is the result of the false contact in response to determining that the detected at least one signal is indicative of a series of successive contacts occurring on the touchscreen within a predetermined area.

22. The wireless power device of claim 19, further comprising:
means for determining that the detected at least one signal is indicative of a continuous contact that exceeds a threshold duration occurring on the touchscreen.

23. The wireless power device of claim 19, further comprising:
means for measuring a noise level of the touchscreen; and
means for determining whether the measured noise level exceeds a threshold.

24. The wireless power device of claim 19, further comprising:
means for estimating the strength of the wireless charging field; and
means for transmitting, based on the estimated strength of the wireless charging field, a second message to the wireless charging device to lower the strength of the wireless charging field to a threshold level.

25. A non-transitory computer-readable medium comprising code that, when executed by a processor, causes the processor to perform a method for receiving charging power via a wireless charging field of a wireless charging device, the method comprising:
detecting at least one signal from a touchscreen, the detected at least one signal indicating an interaction with the touchscreen;
determining whether the detected at least one signal is a result of a false contact with the touchscreen resulting from the wireless charging field; and
transmitting, based on determining that the detected at least one signal is a result of the false contact with the touchscreen, a first message to the wireless charging device to lower a strength of the wireless charging field.

26. The non-transitory computer-readable medium of claim 25, wherein the method further comprises:
determining that the detected at least one signal is the result of the false contact in response to determining that the detected at least one signal is indicative of a series of successive contacts occurring on the touchscreen within a predetermined distance from each other.

27. The non-transitory computer-readable medium of claim 25, wherein the method further comprises:
determining that the detected at least one signal is the result of the false contact in response to determining that the detected at least one signal is indicative of a series of successive contacts occurring on the touchscreen within a predetermined area.

28. The non-transitory computer-readable medium of claim 25, wherein the method further comprises:
determining that the detected at least one signal is the result of the false contact in response to determining that the detected at least one signal is indicative of a continuous contact that exceeds a threshold duration occurring on the touchscreen.

29. The non-transitory computer-readable medium of claim 25, wherein the method further comprises:
measuring a noise level of the touchscreen; and
determining whether the measured noise level exceeds a threshold.

30. The non-transitory computer-readable medium of claim 25, wherein the method further comprises:

estimating the strength of the wireless charging field; and transmitting, based on the estimated strength of the wireless charging field, a second message to the wireless charging device to lower the strength of the wireless charging field to a threshold level.

\* \* \* \* \*